United States Patent [19]  [11] Patent Number: 4,922,330
Saito et al.  [45] Date of Patent: May 1, 1990

[54] METHOD AND APPARATUS FOR AUTOMATICALLY ADJUSTING WHITE BALANCE

[75] Inventors: Kenji Saito; Yoshiaki Nakayama; Yukihiro Kawada, all of Tokyo, Japan

[73] Assignee: Fuji Photo Film Co., Ltd., Kanagawa, Japan

[21] Appl. No.: 378,941

[22] Filed: Jul. 12, 1989

[30] Foreign Application Priority Data

Jul. 18, 1988 [JP] Japan ................................ 63-179689

[51] Int. Cl.$^5$ ........................ H04N 9/64; H04N 5/14
[52] U.S. Cl. ...................................... 358/29; 358/170; 358/171; 358/172
[58] Field of Search ............... 358/29 C, 29, 170, 171, 358/172, 161, 165

[56] References Cited

U.S. PATENT DOCUMENTS

| 4,335,397 | 6/1982 | Tamura ........................ 358/29 C |
| 4,506,290 | 3/1985 | Hashimoto ................... 358/29 C |
| 4,736,241 | 4/1988 | Murakami et al. ............ 358/29 C |
| 4,750,032 | 6/1988 | Nakayama ................... 358/29 C |
| 4,819,060 | 3/1989 | Minema et al. ............... 358/29 C |

FOREIGN PATENT DOCUMENTS

| 2052209 | 1/1981 | Japan .......................... 358/29 C |
| 0002486 | 1/1986 | Japan .......................... 358/29 C |

Primary Examiner—Howard W. Britton
Assistant Examiner—Michael Lee
Attorney, Agent, or Firm—Sughrue, Mion, Zinn, Macpeak & Seas

[57] ABSTRACT

An automatic white balance adjusting method is disclosed in which color difference signals ($E_R - E_y$) and ($E_B - E_y$) are respectively integrated over the entire screen and the gains of red and blue signals are controlled so that the respective integration average values of these two color difference signals can coincide with their respective predetermined reference levels. In the integration of the above color difference signals, integration of the color difference signals of chromatic colors is prohibited. In the automatic white balance adjusting method, in order to check whether the respective color difference signals are chromatic colors or not, the respective color difference signals are added together and subtracted from each other to thereby generate color signals ($E_R + E_B - 2E_y$) and ($E_R - E_B$) and it may be checked whether at least one of these color signals goes beyond threshold levels for removal of chromatic colors respectively set correspondingly to the respective color signals.

2 Claims, 6 Drawing Sheets

FIG. 4(A)
STANDARD COLOR BAR

FIG. 4(B)
SIGNAL ($E_R - E_Y$)

FIG. 4(C)
SIGNAL ($E_B - E_Y$)

FIG. 4(D)
SIGNAL ($E_R + E_B - 2E_Y$)

FIG. 4(E)
SIGNAL ($E_R - E_B$)

FIG. 5

FIG. 6 (A) PICTURE PATERN

FIG. 6 (B) COLOR DIFFERENCE SIGNAL (E$_R$ − E$_Y$)

FIG. 6 (C) COLOR DIFFERENCE SIGNAL AFTER BLANKED (E$_R$ − E$_Y$)

METHOD AND APPARATUS FOR AUTOMATICALLY ADJUSTING WHITE BALANCE

BACKGROUND OF THE INVENTION

1. Field of the Invention

The present invention relates to method and apparatus for automatically adjusting white balance and, in particular, to method and apparatus for automatically adjusting white balance using and internal light measurement system.

2. Description of the Related Art

Conventionally, an automatic white balance adjusting method includes an internal light measurement system in which the white balance can be adjusted by means of the light that is striking on an object. In this internal light measurement system, when the white balance is correct, it is assumed that the average of color difference signals on the entire screen frequently provides a given reference level showing achromatic, and therefore, the gains of the signals of red/blue are feedback controlled so that the average of color difference signals $(E_R - E_Y)$ and $(E_B - E_Y)$ becomes the above-mentioned reference level.

However, in the above system, when the above-mentioned assumption does not hold, for example, in the case of an object with a blue sky and a blue sea for a background, or in the case of an object with a red wall for a background, color difference signals over the entire screen if they are integrated (or averaged), provide blue or red, not grey. If the above-mentioned white balance adjustment is made on such objects, then the backgrounds are caused to fade and the colors of a figure and the like as main objects are controlled in the direction of a complementary color (strong color), resulting in a so called color failure.

In view of this, in order to solve the above-mentioned problem, the present applicant filed an application for patent (Japanese Patent Application No. 62-202,509 and the like) relating to an automatic white balance adjusting method in which strong colors (chromatic colors) are removed from an original picture and only the color information on the portion of achromatic colors such as white, grey and the like within the screen is integrated, thereby eliminating the fading of the background and the miscontrol of main object or the above-mentioned color failure.

Description will be given below of the above-mentioned automatic white balance adjusting method.

Figure 6:
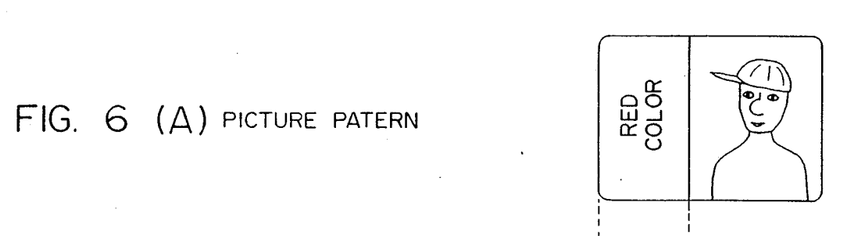

Now, it is assumed that, from a picture containing a strong red color as shown in FIG. 6(A), a color difference signal $(E_R - E_Y)$ as shown in FIG. 6(B) is obtained. When this color difference signal is integrated over the entire screen, the resultant average value is moved in the red direction from a black level. For this reason, if the above-mentioned automatic white balance adjustment is made, then the color of the face of a man is miscontrolled in the direction of the complementary color (cyanogen) of red.

In view of this, in order to blank the color difference signal showing the strong red out of the picture in FIG. 6(A), there is established a certain level (a threshold level) and strong color difference signals exceeding the threshold level are blanked to a black level (black level of a reference color temperature) as shown in FIG. 6(C). As a result of this, the strong color difference signal is removed from the color difference signal of the original picture so that the average value of the color difference signal can be made to approach to a grey color.

Figure 5:
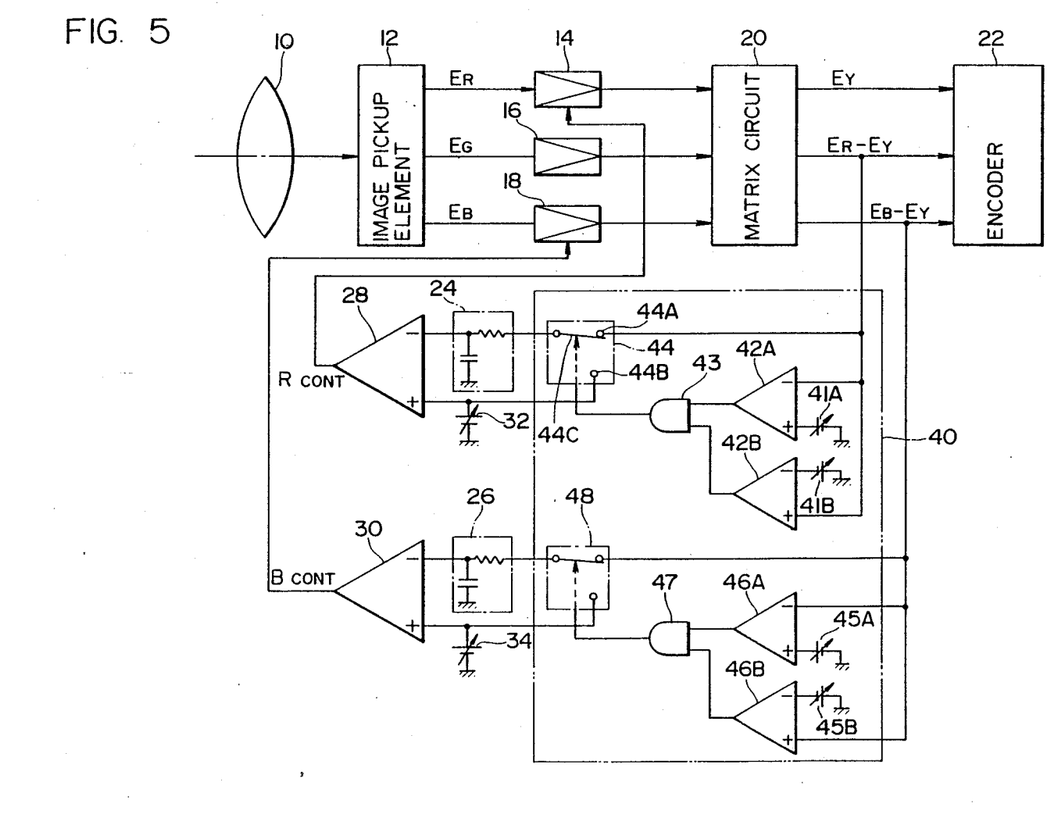
FIG. 5 is a block diagram of an embodiment of an automatic white balance adjusting apparatus according to the prior art; and, FIGS. 6(A) through (C) view used to explain the basic principles applied to the device shown in FIG. 5.

Referring now to FIG. 5, there is shown a block diagram of an example of an automatic white balance adjusting apparatus employing the above-mentioned principle. As shown in FIG. 5, the light that enters through a lens 10 is photoelectrically converted to signals of red, green, and blue ($E_R$, $E_G$, $E_B$) by means of an image pickup element 12. The respective signals ($E_R$, $E_G$, $E_B$) are respectively passed through amplifiers 14, 16, 18 and are then input to a matrix circuit 20, where the signals are converted to brightness signal $E_Y$ and color difference signals $(E_R - E_Y)$, $(E_B - E_Y)$ and then are input to an encoder 22. In the encoder 22, the color difference signals are rectangular two-phase modulated and are then added to the brightness signal $E_Y$. The thus modulated and added signals are output as video signals in the NTSC system from the encoder 22.

On the other hand, the color difference signal $(E_R - E_Y)$ and $(E_B - E_Y)$ are input to a blanking control part 40.

The blanking control part 40 composed of an upper threshold level setting means 41A for the color difference signal $(E_R - R_Y)$, a lower threshold level setting means 41B, comparators 42A, 42B, and AND circuit 43, a blanking switch 44, an upper threshold level setting means 45A for the color difference signal $(E_B - E_Y)$, a lower threshold level setting means 45B, comparators 46A, 46B, an AND circuit 47, and a blanking switch 48.

The upper and lower threshold level setting means 41A and 41B are respectively used to set up upper and lower threshold levels for blanking strong color difference signals on the red and cyanogen sides of the color difference signal $(E_R - E_Y)$, and then also output the upper and lower threshold levels, respectively.

The upper threshold level and the color difference signal $(E_R - E_Y)$ are respectively applied to the positive and negative inputs of the comparator 42A, and the comparator 42A compares these two input signals to output an H level signal when the color difference signal $(E_R - E_Y)$ is smaller than the upper threshold level and to output a strong color difference detection signal (an L level signal) when the color difference signal is greater than the upper threshold level. Also, to the positive and negative inputs of the comparator 42B are applied the color difference signal $(E_R - E_Y)$ and the lower threshold level, respectively. The comparator 42B compares these two input signals and outputs the H level signal when the color difference signal $(E_R - E_Y)$ is greater than the lower threshold level while it outputs the strong color difference detection signal (L level signal) when the color difference signal is smaller than the lower threshold level.

The AND circuit 43 outputs an H level signal when both of the two input signals from the comparators 42A, 42B are both H level signals, that is, when the color difference signal $(E_R - E_Y)$ is present between the upper and lower threshold levels, while it outputs an L level signal when at least one of the two input signals is an L level signal, that is, when the color difference signal $(E_R - E_Y)$ goes beyond the upper or lower threshold level.

The blanking switch 44 comprises an input contact 44A to which the color difference signal $(E_R - E_Y)$ is input, and input contact 44B to which a reference level from a reference level setting means 32 is input, and a traveling contact 44C which can be selectively connected to one of these contacts 44A, 44B. When the H level signal is input from the AND circuit 43, the blanking switch 44 connects the traveling contact 44C to the contact 44A and outputs the color difference signal ($E_R - E_Y$) to an integrating circuit 24. When the L level signal is input from the AND circuit 43, the blanking switch 44 connects the traveling contact 44C to the contact 44B and outputs the reference level to the integrating circuit 24.

On the other hand, the upper and lower threshold level setting means 45A and 45B are respectively used to set up the upper and lower threshold levels which are respectively used to blank a strong color difference signal on the blue side of the color difference signal ($E_B - E_Y$) and a strong color difference signal on the yellow side thereof. Also, the comparators 46A, 46B, AND circuit 47 and blanking switch 48 can be operated similarly to the above-mentioned comparators 42A, 42B, AND circuit 43 and blanking switch 44 and, therefore, the detailed description thereof is omitted here.

As can be understood from the foregoing description, the color difference signals ($E_R - E_Y$) and ($E_B - E_Y$) are integrated by the integrating circuits 24 and 26, respectively. In such integration, when the color difference signal provides a strong color difference signal going beyond the upper or lower threshold level, the strong color difference signal is blanked before the color difference signal is integrated (that is, the reference level is integrated in place of the strong color difference signal).

The integration average values respectively integrated by the above-mentioned integrating circuits 24 and 26 are then input to the negative inputs of difference amplifiers 28 and 30, respectively. By the way, to the positive inputs of the difference amplifiers 28 and 30 there are input from reference level setting means 32 and 34 reference levels which are respectively the average values of the color difference signals ($E_R - E_Y$) and ($E_B - E_Y$) when the average value of the colors over the entire screen shows an achromatic color. Thus, the difference amplifier 28 outputs to the amplifier 14 a gain control signal $R_{CONT}$ which can be obtained by amplifying a difference between the above-mentioned two input signals, thereby controlling the gain of a primary color signal $E_R$ which is amplified by the amplifier 14. Also, the difference amplifier 30 outputs to the amplifier 18 a gain control signal $B_{CONT}$ which can be obtained by amplifying a difference between the above-mentioned two input signals, thereby controlling the gain of a primary color signal $E_B$ to be amplified by the amplifier 18. By means of this, the primary color signals $E_R$, $E_B$ are controlled in such a manner that the average values of the color difference signals ($E_R - E_Y$), ($E_B - E_Y$) over the entire screen can coincide with the reference levels, respectively.

However, since the color difference signals ($E_R - E_Y$) and ($E_B - E_Y$) vary greatly with respect to the variations of the color temperature, the width of the threshold levels in the above-mentioned threshold level setting means 41A, 41B, 45A, 45B must be comparatively greater and, as a result of this, the strong color cannot be removed to a sufficient degree. Also, if the width of the threshold level is narrowed, then the detection signal varies according to color temperatures, so that even such portion which should not be blanked is blanked. This is another inconvenience in the prior art automatic white balance adjusting method and apparatus.

SUMMARY OF THE INVENTION

The present invention aims at eliminating the drawbacks found in the above-mentioned prior art automatic white balance adjusting method and apparatus.

Accordingly, it is an object of the invention to provide improved automatic white balance adjusting method and apparatus which is capable of narrowing the width of threshold levels, of removing a color of low saturation and a color having a small color difference, and of limiting the color information to be used for the white balance adjustment only to the color information the achromatic color portion of which is considered to have varied according to color temperatures, thereby achieving an excellent white balance adjustment.

In order to attain the above-mentioned object, according to the invention, there is provided a method of automatically adjusting the white balance in which color difference signals ($E_R - E_Y$) and ($E_B - E_Y$) are generated respectively from signals obtained by photographing an object, the color difference signals are integrated respectively over the whole screen, and the gains of red and blue signals are controlled such that respective integration average values of the color difference signals can coincide with predetermined reference levels respectively, the white balance adjusting method being characterized in that color signals ($E_R + E_B - 2E_Y$) and ($E_R - E_B$) respectively obtained by means of addition and subtraction of the above-mentioned color difference signals are generated in accordance with signals obtained by photographing the above-mentioned object, threshold levels for removal of chromatic colors included in threshold levels to be set respectively in accordance with the above-mentioned color signals generated and corresponding to the color signal ($E_R - E_B$) are set in accordance with the integration average value obtained by integrating the color signal ($E_R - E_B$) over the whole screen, and, during a period in which at least one of the above-mentioned color signals is in excess of the set threshold levels, the integration of the above-mentioned color difference signals is prohibited and the color difference signals during such period are removed.

According to the invention, in view of the fact that the above-mentioned color signal ($E_R + E_B - 2E_Y$) does not vary greatly with respect to the variations of color temperatures, this color signal ($E_R + E_B - 2E_Y$) is generated from signals which are obtained by photographing an object. Also, since there exist the strong colors that cannot be excluded or removed only by this color signal, another color signal ($E_R - E_B$) is also generated in order to remove such strong colors. Due to the fact that the color signal ($E_R - E_B$) varies greatly according to the variations of the color temperatures, the threshold levels for removal of chromatic colors corresponding to the color signal ($E_R - E_B$) are shifted in accordance with the integration average values that are obtained by integrating the color signal ($E_R - E_B$) over the whole screen. Further, when the color difference signals ($E_R - E_Y$) and ($E_B - E_Y$) to be generated from the signals obtained by photographing the object are respectively integrated to thereby find the average values thereof over the whole screen, if at least one of the above-mentioned color signals ($E_R + E_B - 2E_Y$) and ($E_R - E_B$) is in excess of the preset threshold levels, then it is decided that either of the color difference signal ($E_R - E_Y$) or ($E_B - E_Y$) is not an achromatic part and, therefore, the integration of the relevent color difference signal during such period is progibited. In other words, even when the average value of an original picture on the whole screen does not provide a grey color or even when the color temperatures vary, it is possible to integrate only the information on the portions of the original picture which are comparatively adjacent to achromatic color with the strong colors being excluded and the gains of red and blue signals are controlled such that the integration average values can be made to approach a grey color of a reference color temperature, so that an excellent white balance adjustment can be realized.

BRIEF DESCRIPION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiments of method and apparatus for automatically adjusting white balance according to the present invention with reference to the accompanying drawings.

The basic principles of the present invention are similar to those of the above-mentioned prior application for patent made by the present applicant, but the present invention is different from the prior application in the following point. That is, while the prior application uses the color signals ($E_R - E_Y$) and ($E_B - E_Y$) as comparison references for removal of chromatic colors, the present invention employs, as comparison references removal of chromatic colors, color signals ($E_R + E_B - 2E_Y$) and ($E_R - E_B$) which are obtained by means of addition and subtraction of the above-mentioned color signals ($E_R - E_Y$) and ($E_B - E_Y$).

Next, we will describe the reason why the above-mentioned color signal ($E_R + E_B - 2E_Y$) is used as a comparison reference for removal of chromatic colors.

Figure 2:
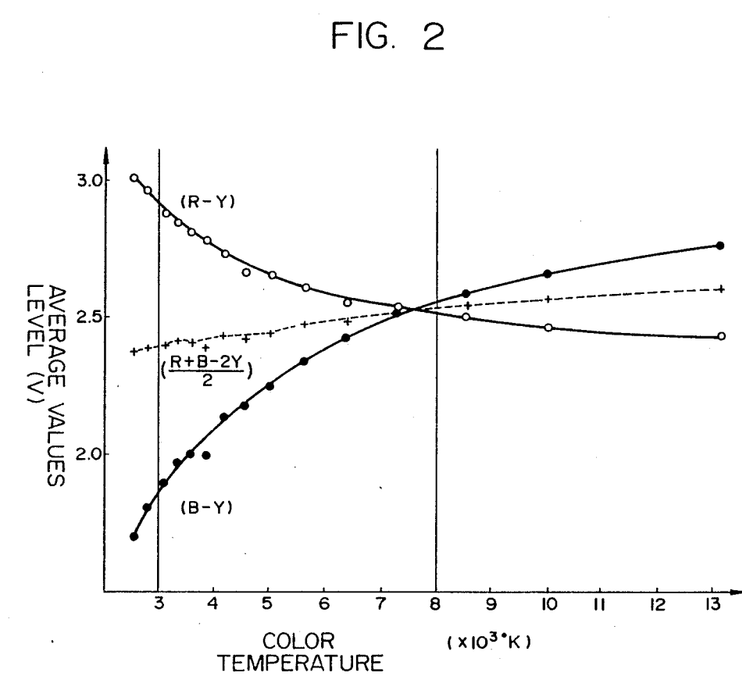
FIG. 2 is a graphical representation of the respective average values levels of color difference signals ($E_R - E_Y$), ($E_B - E_Y$) and a color signal ($E_R + E_B - 2E_Y$), using color temperatures as parameters.

Referring here to FIG. 2, there is shown a graphical representation in which the respective average value levels of color difference signals ($E_R - E_Y$), ($E_B - E_Y$) and a color signal ($E_R + E_B - 2E_Y$)/2 are illustrated using color temperatures as parameters. As shown in FIG. 2, when attention is paid to the variations of the color temperatures of a target (3000° K.~8000° K.), the color difference signals ($E_R - E_Y$) and ($E_B - E_Y$) vary greatly with respect to the color temperature variations, but, since the varying properties of the two color difference signals ($E_R - E_Y$) and ($E_B - E_Y$) are equal in value but opposite in direction to each other, in the color signal ($E_R + E_B - 2E_Y$) obtained by addition of the two color difference signals, the variations thereof can be cancelled by each other, so that the color signal ($E_R + E_B - 2E_Y$) varies little and provides a highly stable signal.

For this reason, if the color signal ($E_R + E_B - 2E_Y$) is used as a comparison reference and the width of a threshold level is set for the width of the variations of the color signal, then a portion within this width can be decided as an achromatic color portion by nature. Due to this, a threshold level used to remove a desired chromatic color portion can be fixed and also the width of the threshold level can be reduced to a minimum.

However, because there exists a strong color portion which cannot be removed only by the above-mentioned color signal ($E_R + E_B - 2E_Y$), another color signal ($E_R - E_B$) is also used as a comparison reference in order to remove such strong color portion.

Figure 3:
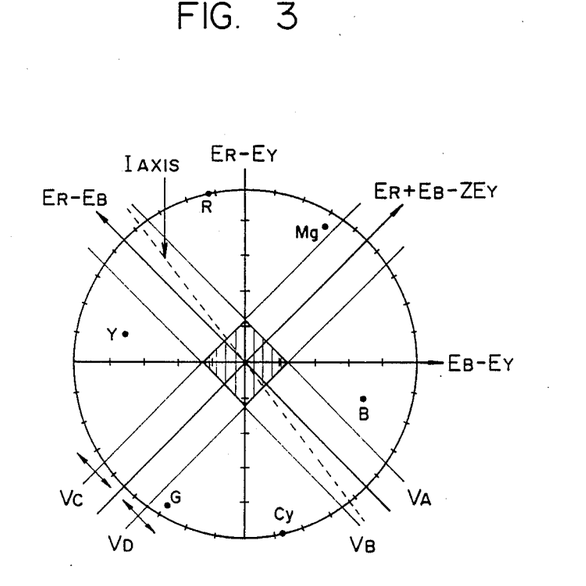
FIG. 3 is a graphical representation of a vector scope including the axis of a color signal used in the present invention.

This color signal ($E_R - E_B$), as shown in a vector scope in FIG. 3, is very close to an I axis, while the color temperatures move substantially on the I axis. For this reason, the color signal ($E_R - E_B$) is unstable with respect to the variations of the color temperatures and thus there is a limit to narrow the threshold levels of the color signal ($E_R - E_B$).

In view of this, according to the present embodiment, threshold levels $V_A$ and $V_B$ for the color signal ($E_R + E_B - 2E_Y$) are fixed, while threshold levels $V_C$ and $V_D$ for the color signal ($E_R - E_B$) are shiftable according to the variations of the color temperatures.

Figure 1:
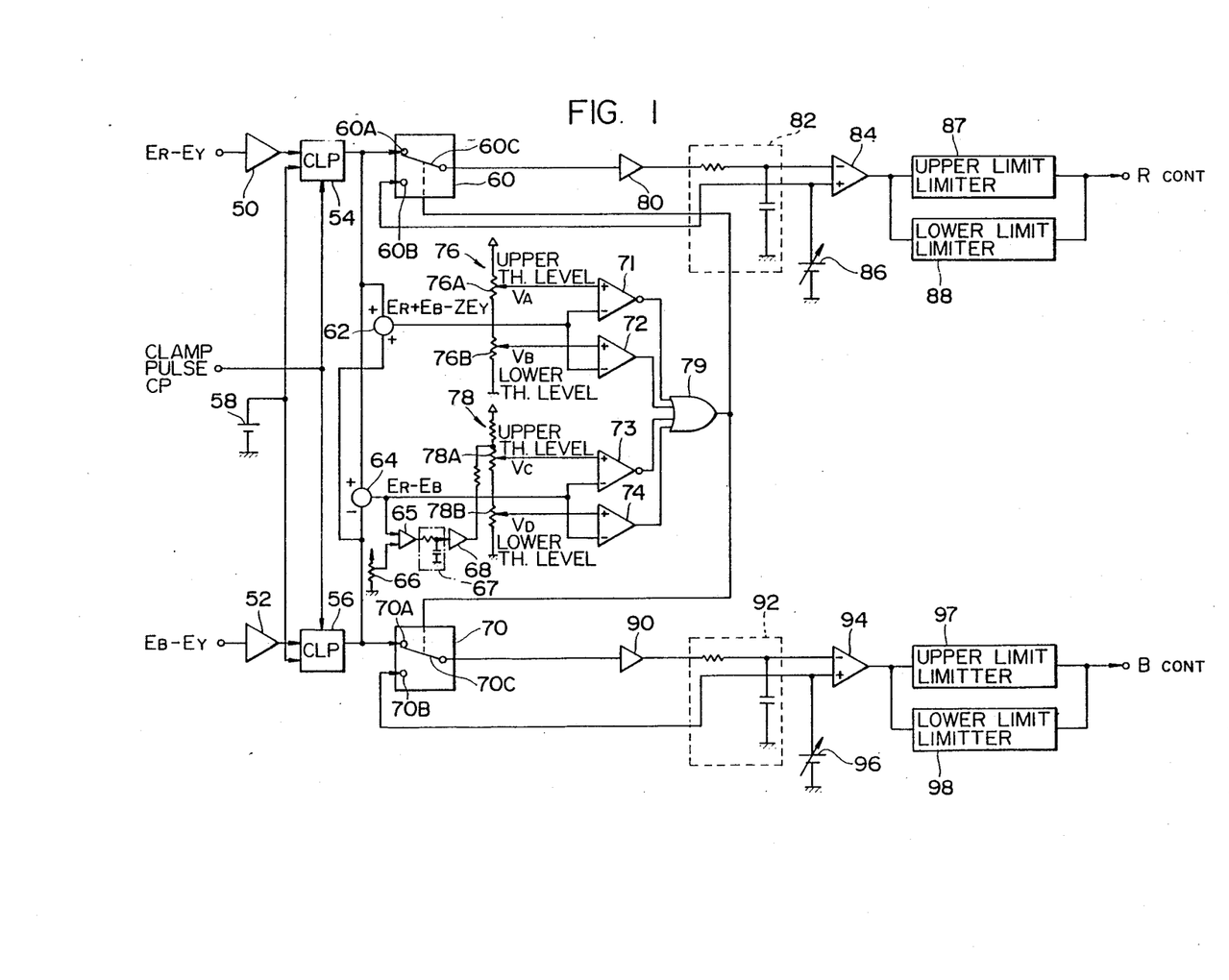
FIG. 1 is a block diagram of an embodiment of the structure of main portions of an automatic white balance adjusting apparatus according to the invention.

Referring now to FIG. 1, there is shown a block diagram of an embodiment of the structure of main portions of an automatic white balance adjusting apparatus according to the invention. In particular, in FIG. 1, there is illustrated a circuit which generates gain control signals $R_{CONT}$ and $B_{CONT}$ for controlling the gains of amplifiers 14 and 18 in accordance with the color difference signals ($E_R - E_Y$) and ($E_B - E_Y$) input from a matrix circuit 20, as shown in FIG. 5.

In FIG. 1, the color difference signals ($E_R - E_Y$) and ($E_B - E_Y$) are respectively applied through amplifiers 50 and 52 to clamp circuits 54 and 56. The DC values (reference levels) to be pedestal clamped from a clamp pulse CP and a setting means 58 are applied to the clamp circuits 54 and 56, respectively. The clamp cireuit 54 pedestal clamps the color difference signal ($E_R - E_Y$) in synchronization with the clamp pulse CP and then outputs the pedestal clamped signal to the switch 60, and adder 62 and a subtracter 64 and, similarly, the clamp circuit 56 pedestal clamps the color difference signal ($E_B - E_Y$) in synchronization with the clamp pulse CP and then outputs the pedestal clamped signal to a switch 70, the adder 62 and the subtracter 64.

The adder 62 adds the two color difference signals ($E_R - E_Y$) and ($E_B - E_Y$) that are input therein in the above-mentioned manner and then outputs the added value thereof, that is, a color signal ($E_R + E_B - 2E_Y$) to the negative inputs of comparators 71 and 72, while the subtracter 64 subtracts the color difference signal ($E_B - E_Y$) from the color difference signal ($E_R - E_Y$), both of which are input therein in the above-mentioned manner, and outputs the subtracted value thereof, that is, the color signal ($E_R - E_B$) to the negative inputs of comparators 73 and 74 as well as through a buffer amplifier 65 to an integrating circuit 67.

The integrating circuit 67 integrates the color signal ($E_R - E_B$) that is input thereto through the buffer amplifier 65 and applies the integration average value on the entire screen to a threshold level setting means 78 through a buffer amplifier 68. Here it should noted that there is applied to the buffer amplifier 65 from a control volume 66 a signal for controlling the buffer amplifier 65 such that the buffer amplifier 65 can output a desired voltage to the threshold level setting means 78, for example, when a reference chart is photographed.

On the other hand, to the positive inputs of the comparators 71 and 72 there are applied an upper threshold level $V_A$ and a lower threshold level $V_B$ respectively from the upper and lower threshold level setting portions 76A and 76B of a threshold level setting means 76 and, similarly, to the positive inputs of the comparators 73 and 74 there are applied an upper threshold level $V_C$ and a lower threshold level $V_D$ respectively from the upper and lower threshold level setting portions 78A and 78B of a threshold level setting means 78.

It should be noted here that the upper and lower threshold levels $V_C$ and $V_D$ respectively set by the threshold level setting means 78 are shifted by the integration average value that is applied from the above-mentioned integrating circuit 67 through the buffer amplifier 68. That is, by shifting the upper and lower threshold levels $V_C$ and $V_D$ according to the integration average value of the color signal ($E_R - E_B$), the threshold levels can be set according to the variations of the color temperatures (the above-mentioned integration average value varies according to the variations of the color temperatures). By means of this, the widths of the upper and lower threshold levels $V_C$ and $V_D$ can be narrowed to a sufficient degree, so that a chromatic color portion can be removed as will be discussed later.

The two comparators 71 and 72 respectively output an L level signal when the color signal ($E_R + E_B - 2E_Y$) is present between the upper and lower threshold levels $V_A$ and $V_B$ set for the same color signal, and the comparators 71 and 72 respectively output a H level signal when the color signal ($E_R + E_B - 2E_Y$) goes beyond the upper threshold level $V_A$ or goes below the lower threshold level $V_B$. On the other hand, the comparators 73 and 74 respectively output an L level signal when the color signal ($E_R - E_B$) is present between the upper and lower threshold levels $V_C$ and $V_D$ set in the above-mentioned manner, and they respectively output a H level signal when the color signal ($E_R - E_B$) goes beyond the upper threshold level $V_C$ or goes below the lower threshold level $V_D$. And, the output signals of the above-mentioned four comparators 71 to 74 are guided through an $O_R$ circuit 79 to switches 60 and 70, respectively.

The switches 60 and 70 normally connects traveling contact pieces 60C and 70C to contacts 60A and 70A respectively to guide the pedestal clamped color signal ($E_R - E_Y$) and ($E_B - E_Y$) through buffers 80 and 90 to integration circuits 82 and 92 respectively. However, when one or more H level signals are input thereto through the OR circuit 79 from at least one of the four comparators 71~74 the switches 60 and 70 respectively disconnect the traveling contact pieces 60C, 70C out of the contacts 60A and 70A and connect the contact pieces to contacts 60B and 70B for inputting of the reference levels, thereby guiding the reference levels to the integration circuits 82 and 92.

The integration circuits 82 and 92 are respectively adapted to integrate the color difference signals ($E_R - E_Y$) and ($E_B - E_Y$). However, as mentioned before, while the color signal ($E_R + E_B - 2E_Y$) or ($E_R - E_B$) is exceeding the range of the threshold levels previously set, the circuits 82 and 92 respectively blank and integrate the color difference signals ($E_R - E_Y$) and ($E_B - E_Y$) that are being output during such duration (that is, they integrate the reference levels in place of the color difference signals).

The integration average values obtained by the above-mentioned integration by the integration circuits 82 and 92 are input respectively to the negative inputs of difference amplifiers 84 and 94, while to the positive inputs of the difference amplifiers 84 and 94 there are input respectively from reference level setting means 86 and 96 the reference levels that are respectively the average values of the color difference signals ($E_R - E_Y$) and ($E_B - E_Y$) obtained when the color average value on the entire screen provides the grey color.

The difference amplifier 84 outputs through upper and lower limit limiters 87 and 88 to the amplifier 14 the gain control signal $R_{CONT}$ that is obtained by amplification of an difference between the above-mentioned two input signals (FIG. 4) to thereby control the gain of the primary color signal $E_R$ that is amplified by the amplifier 14. Also, the difference amplifier 94 outputs through upper and lower limit limiters 97 and 98 to the amplifier 18 the gain control signal $B_{CONT}$ that is obtained by amplification of a difference between the above-mentioned two input signals to thereby control the gain of the primary color signal $E_B$ that is amplified by the amplifier 18. The above-mentioned upper and lower limit limiters 87, 88, 97, 98 control the upper and lower limits of the gain control signals $R_{CONT}$ and $B_{CONT}$ that are respectively output from the difference amplifiers 84 and 94 so as to prevent more gain control than necessary with respect to the red and blue signals.

In this manner, the primary color signals $E_R$, $E_B$ are respectively feedback controlled in such a manner that the average values on the entire screen of the color difference signals ($E_R - E_Y$) and ($E_B - E_Y$) exclusive of the strong color portions can coincide with the reference levels respectively.

Figure 4A:
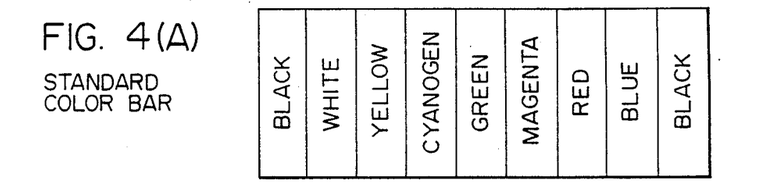
FIG. 4(A) is a table of a standard color bar including standard colors.
Figures 4B, 4C:
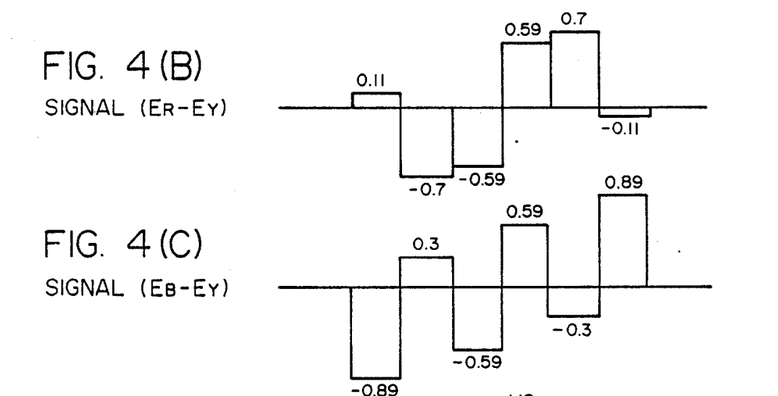
FIGS. 4(B) through (E) are respectively graphical representations of the amplitude values of the signals ($E_R - E_Y$), ($E_B - E_Y$), ($E_R + E_B - 2E_Y$) and ($E_R - E_B$)
Figure 4D:
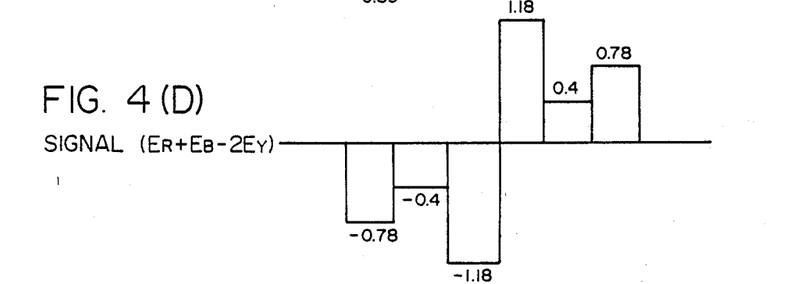
Figure 4E:
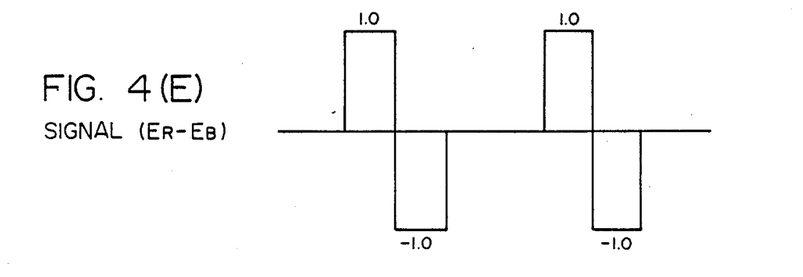

Here, when the combinations of the primary colors are formed with respect to the respective colors in the standard color bar shown in FIG. 4(A) and also the primary color signals with respect to the brightest white are set such that $E_R = E_G = E_B = 1.0$, then the amplitude values of the color difference signals ($E_R - E_Y$), ($E_B - E_Y$) and the color signals ($E_R + E_B - 2E_Y$), ($E_R - E_B$) with respect to the respective colors in the standard color bar are as shown in FIG. 4(B) through (E).

As shown in these figures, when the color difference signals ($E_R - E_Y$) and ($E_B - E_Y$) are used as the comparison references, the green, magenta and the like cannot be detected easily, but, when the color signal ($E_R + E_B - 2E_Y$) and ($E_R - E_B$) are employed as the comparison references, then the colors can be detected more easily, because green and magenta are made larger than the color signal ($E_R + E_B - E_Y$) and yellow, cyanogen, red and blue are made larger than the color signal ($E_R - E_B$) before they are compared.

Also, although in the present embodiment the upper and lower threshold levels of the color signal ($E_R - E_B$) are shifted according to the integration average value of the color signal ($E_R-E_B$), the present invention is not always limited to this, but the upper and lower threshold levels of the color signal may be shifted according to the integration average value of I signals which are generated by a matrix circuit, so that the threshold levels can be set according to the variations of the color temperature.

Further, in the present embodiment, the reference levels are applied to the contacts 60B and 70B of the switches 60 and 70, respectively. However, this is not always limitative, but, alternatively, arbitrary levels in the neighborhood of the reference levels may be applied. In addition, the contacts 60B and 70B of the switches 60 and 70 may be insulated an, when the movable contacts 60C and 70C of the switches 60 and 70 are switched over to these contacts, the integrating circuits 82 and 92 can be put into a floating input state, respectively, that is, input and output of any signals to and from the integrating circuit 82 and 92 are prohibited, so that the integration values can remain unchanged.

As has been described hereinbefore, according to the automatic white balance adjusting method and apparatus in accordance with the present invention, due to the fact that, when there is included a chromatic color in a picture, the color difference signals ($E_R-E_Y$) and ($E_B-E_Y$) including such chromatic color are not to be integrated, even when there are included many characteristic chromatic colors over the entire screen, the integration average valued of the color difference signals ($E_R-E_Y$) and ($E_B-E_Y$) obtained by extracting achromatic color portions from the entire screen can be made to approach to the achromatic colors of the reference color temperatures, thereby eliminating miscontrol such as fading of color, color failure and the like. Especially, in order to detect the color difference signals ($E_R-E_Y$) and ($E_B-E_Y$) including the chromatic colors, the color signal ($E_R+E_B-2E_Y$) which is stable with respect to the variations of the color temperatures is used, with the result that the widths of the threshold levels for the same color signal can be narrowed to a sufficient degree. Also, for the color signal ($E_R-E_B$) which is unstable with respect to the variations of the color temperatures, the threshold levels are shifted according to the variations of the color temperature, so that the widths of threshold levels for the same color signal can also be narrowed to a sufficient degree. Thus, according to the present invention, colors having a comparatively lower degree of saturation as well as colors having a small color difference can also be removed, so that an excellent white balance adjustment can be realized.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. In a method of automatically adjusting white balance in which color difference signals ($E_R-E_Y$) and ($E_B-E_Y$) are respectively generated from signals obtained by photographing an object, the respective color difference signals are integrated over an entire screen, and the gains of red and blue signals are controlled so that the integration average values of the respective color difference signals are equal to their predetermined reference levels, the improvement comprising that color signals ($E_R+E_B-2E_Y$) and ($E_R-E_B$) respectively obtained by means of addition and subtraction of said two color difference signals are generated in accordance with signals obtained by photographing said object, that, in threshold levels for removal of a chromatic color respectively set correspondingly to said respective color signals generated, threshold levels corresponding to said color signal ($E_R-E_B$) are set in accordance with an integration average value obtained by integrating said color signal ($E_R-E_B$) or an I signal over the entire screen, and that, while at least one of said respective color signals exceeds said threshold levels set, the integration of said respective color difference signals is prohibited and the color difference signals during such period can be removed.

2. Apparatus for automatically adjusting white balance, comprising:
   first and second gain control circuits respectively for controlling the gains of red and blue signals among signals obtained by photographing an object;
   first and second integrating circuits respectively for integrating color difference signals ($E_R-E_Y$) and ($E_B-E_Y$) over an entire screen, said color difference signals being generated from said signals obtained by photographing said object;
   color signal generating means for generating color signals ($E_R+E_B-2E_Y$) and ($E_R-E_B$) obtained by means of addition and subtraction of said respective color difference signals in accordance with said signals obtained by photographing said object;
   a plurality of threshold level setting means respectively for setting threshold levels for removal of a chromatic color according to said generated color signals ($E_R+E_B-2E_Y$) and ($E_R-E_B$);
   means for integrating said color signal ($E_R-E_B$) or an I signal generated from said signals obtained by photographing said object over the entire screen and for shifting the threshold levels of threshold level setting means corresponding to said color signal ($E_R-E_B$) in accordance with the integration average value of said color signal or said I signal;
   a plurality of comparators respectively disposed for each of said color signal ($E_R+E_B-2E_Y$) and ($E_R-E_B$) for inputting said respective color signals and said threshold levels set correspondingly to said color signals and, when at least one of said color signals goes beyond said threshold levels, for outputting a chromatic color detection signal;
   first and second switches respectively for preventing said respective color difference signals from being received by said first and second integrating circuits while at least one of said plurality of comparators outputs a chromatic color detection signal;
   first and second reference level setting means respectively for setting the predetermined reference levels that the average values of said color difference signals over the entire screen must take;
   means for comparing the integration average value of said first integrating circuit with the reference level of said first reference level setting means and for adjusting the gain of said first gain control circuit so that said integration average value and said reference level can coincide with each other; and,
   means for comparing the integration average value of said second integrating circuit with the reference level of said second reference level setting means and for adjusting the gain of said second gain control circuit so that said integration average value and said reference can coincide with each other.

* * * * *